United States Patent [19]

Miller et al.

[11] Patent Number: 4,767,040

[45] Date of Patent: Aug. 30, 1988

[54] SNAP-IN END CAP FOR ARTICLE CARRIERS

[76] Inventors: Dennis J. Miller, 5342 Carleton Rockwood, South Rockwood, Mich. 48179; Leon W. Tylenda, 26228 Newport, Warren, Mich. 48089

[21] Appl. No.: 36,258

[22] Filed: Apr. 9, 1987

[51] Int. Cl.⁴ ............................................. B60R 9/04
[52] U.S. Cl. .................................... 224/326; 224/325
[58] Field of Search ............... 224/309, 315, 319, 321, 224/324, 325, 326; 220/284; 410/101

[56]  References Cited

U.S. PATENT DOCUMENTS

| 4,030,647 | 6/1977 | Rasor et al. | |
|---|---|---|---|
| 4,030,648 | 6/1977 | Johnson et al. | 224/31 |
| 4,170,322 | 10/1979 | Bott | 224/326 |
| 4,225,068 | 9/1980 | Ingram . | |
| 4,281,783 | 8/1981 | Ingram . | |
| 4,343,419 | 8/1982 | Mareydt | 224/326 |
| 4,440,333 | 4/1984 | Bott | 224/326 X |
| 4,473,178 | 9/1984 | Bott | 224/326 X |
| 4,501,386 | 2/1985 | Rasor et al. | 224/326 |
| 4,516,710 | 5/1985 | Bott | 224/326 X |
| 4,673,100 | 6/1987 | Reis et al. | 220/284 X |

Primary Examiner—Mark J. Thronson
Assistant Examiner—Robert Petrik
Attorney, Agent, or Firm—Reising, Ethington, Barnard, Perry & Milton

[57]  ABSTRACT

A slat assembly for vehicle luggage racks is disclosed with a snap-in end cap. The end cap has a shank portion which is telescoped inside the end of the channel-shaped slat and a head portion is disposed exteriorly of the slat. A detent element in the form of a tang in the base of the slat coacts with a detent element in the form of a ramp surface on the bottom of the shank of the end cap to interlock the end cap and slat. A stud is molded into the end cap for mounting the slat assembly on a vehicle body panel.

7 Claims, 1 Drawing Sheet

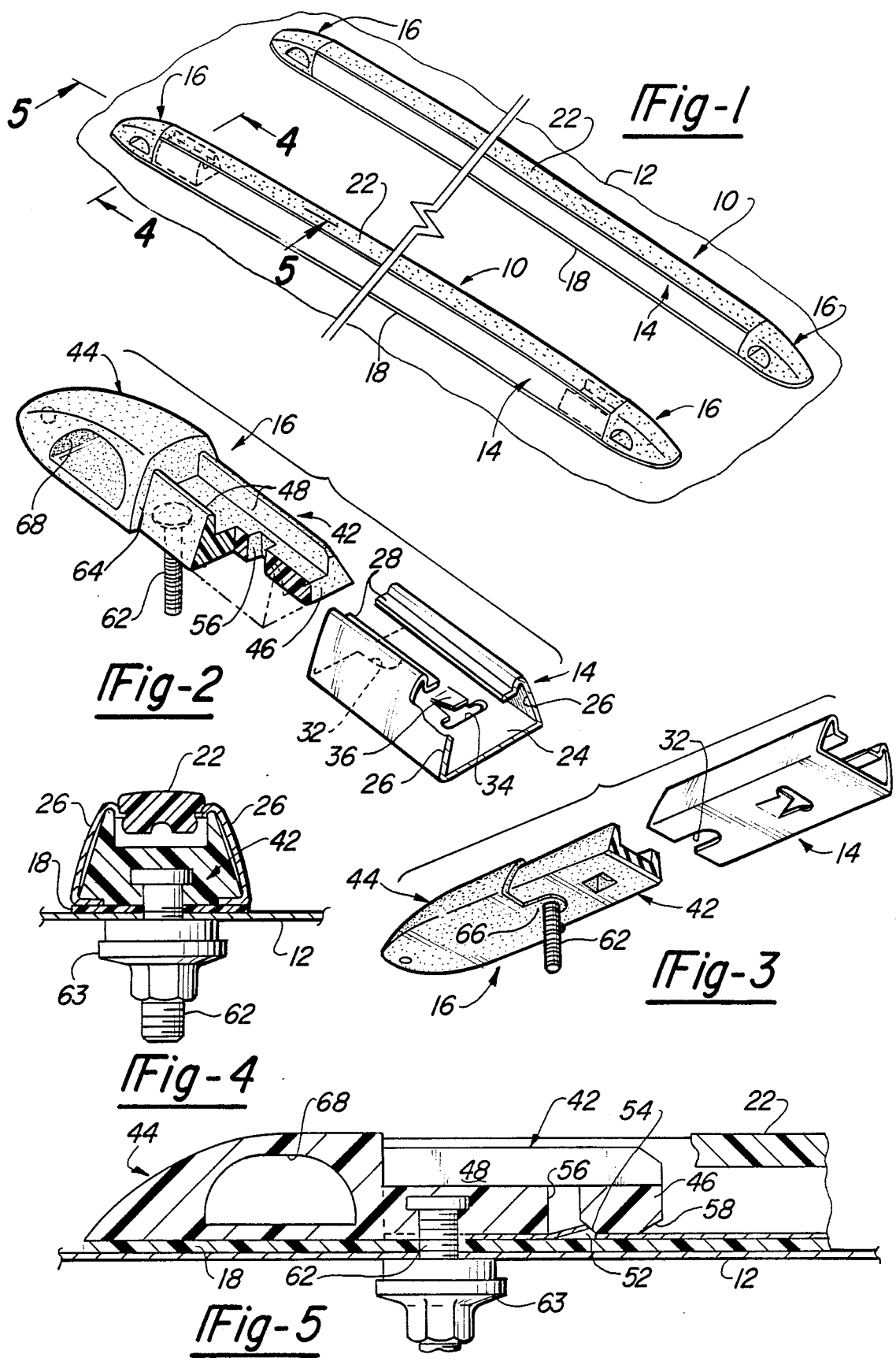

SNAP-IN END CAP FOR ARTICLE CARRIERS

FIELD OF THE INVENTION

This invention relates to article carriers, such as luggage racks for automotive vehicles; more particularly, it relates to an improved slat assembly for such article carriers.

BACKGROUND OF THE INVENTION

Vehicle manufacturers commonly offer article carriers such as luggage racks as an optional item for sale with a new vehicle. Such article carriers are adapted to be mounted on a body panel of the vehicle, either the rear deck or the vehicle top and the carrier is installed on a vehicle assembly line. A typical article carrier for installation on the rear deck is comprised of a pair of side rails each having a stanchion at the front and rear end and a cross rail extending between the rear stanchions. A plurality of load supporting slat assemblies are disposed within the side rails and are individually secured to the deck lid. A slat assembly typically comprises a sheet metal slat in a channel-shape which is provided with an end cap at each end. Each end cap may have an opening therethrough to receive a tie down cord for articles to be carried on the rack. A protective rub strip extends lengthwise of the slat and closes the upper side of the channel formed thereby and may be snap fitted into place to engage the upper edges of the slat. An insulating liner is disposed between the bottom of the slat and the body bracket by a snap-in bail and socket joint. The Ingram patent U.S. Pat. No. 4,281,783 granted Aug. 4, 1981 discloses a detachable luggage carrier which is mounted by legs extending through the deck lid and retained in place by detents.

It is a general object of this invention to provide an improved pre-assembled end cap and slat for an article carrier which overcomes certain disadvantages of the prior art.

SUMMARY OF THE INVENTION

According to this invention, there is provided a combined slat and end cap for an article carrier which is economical to manufacture and which greatly facilitates installation. This is accomplished by a one piece molded end cap havine a detent fitting with the slat permitting a snap-in connection. Further, a fastener stud is molded in the end cap for attachment to the vehicle panel.

Further, in accordance with this invention, an article carrier slat includes a base member and a pair of oppositely disposed spaced side walls forming a channel. An end cap extends into one end of the slat and detent means are provided which are adapted to be engaged in response to the end cap reaching a predetermined position relative to the slat upon insertion thereof into the channel. A fastener is carried by the end cap for securing it to the body panel of the vehicle. Further, according to this invention, the slat is formed of sheet metal and the panel and fastening means are provided for securing the slat to the panel. It is desired to provide the slats as pre-assembled units so as to minimize the number of parts that must be handled on the assembly line for installing the article carrier. For this purpose, it is also desired to avoid the need for handling separate fastener elements such as screws when the slats are installed on the vehicle.

In the prior art, it is known to provide slats for luggage racks with pre-attached end caps, as shown in the Rasor et al patent U.S. Pat. No. 4,501,386 granted Feb. 26, 1985. The slat disclosed by this patent is provided with an end cap having a portion which is inserted into the end of the channel-shaped slat and secured thereto by a drive pin extending through the base of the slat. A screw hole is provided in the tongue portion of the end cap and receives a mounting screw which extends through the body panel of the vehicle and is held by a nut when the slat is installed. After the nut is tightened on the screw, the rub strip is snap fitted into the top of the slat.

Also, in the prior art, it is known to use snap-in arrangements to hold members of a luggage rack in assembled relation. The Ingram patent U.S. Pat. No. 4,225,068 granted Sept. 30, 1980 discloses a luggage rack with the ends of longitudinal extending rails being held in assembly with a cross rail member by means of punched out tabs. The Rasor et al patent U.S. Pat. No. 4,030,647 granted June 21, 1977 discloses a luggage rack in which a side rail is secured to a support end cap is a unitary molded body having a tongue and a head. The detent means comprises a resilient detent element and a retaining detent element. Preferably, the resilient detent element is a tang pierced from the base of said slat and the retaining detent element is a shoulder adjacent a recess in the bottom of said shank. Further, the end cap carries an integral fastener stud which is molded therein for securing the end cap to the body panel.

A complete understanding of this invention may be obtained from the detailed description that follows taken with the accompanying drawings.

DESCRIPTION OF THE DRAWINGS

FIG. 1 is a perspective view of a pair of article support slat assemblies mounted on a vehicle body panel;

FIG. 2 is an exploded view of an end cap and a slat;

FIG. 3 is another exploded view of the end cap and slat;

FIG. 4 is a sectional view taken on lines 4—4 of FIG. 1; and

FIG. 5 is a sectional view taken on lines 5—5 of FIG. 1.

BEST MODE FOR CARRYING OUT THE INVENTION

Referring now to the drawings, there is shown an illustrative embodiment of the invention in a slat assembly for use in a luggage carrier of an automotive vehicle. It will be appreciated as the description proceeds, that the invention may be used in other applications and may be embodied in different forms.

FIG. 1 shows a pair of article support slat assemblies 10 mounted on a body panel, such a deck lid 12. It will be understood that the two support slat assemblies shown form a part of a luggage carrier which may comprise a plurality of such slat assemblies together with side and rear rails. Each of the slat assemblies 10 comprises a slat 14 with an end cap 16 at each end. It also comprises an insulating liner 18 disposed between the slats and the body panel 12. The upper side of the slat 14 is provided with a protective rub strip 22. A set of support salt assemblies 10, when used in conjunction with luggage rack rails, are adapted to support an article, such as a piece of luggage.

The slat 14 is formed of sheet metal, such as stainless steel, and is provided with a base 24 and a pair of upstanding side walls 26. Each of the side walls 26 is rolled over at its upper free edge and terminates in an inwardly directed flange 28. The base 24 is provided at its free end with a central, longitudinally extending slot 32. Also, adjacent each end of the slat 14, the base 24 is provided with a punched clearance hole 34 extending transversely of the base. Also, the base 24 is provided with a tang 36 which is pierced from the base and extends longitudinally thereof with a free end adjacent the hole 34 and leaving the opposite end attached to the base. The tang 36 is bent upwardly at its free end so that it extends obliquely of the base 24 and is resiliently displaceable toward and away from the base 24. The purposes of the slot 32 and the tang 36 will be described subsequently in conjunction with the end cap 16.

The end cap 16 is adapted to be pre-assembled and interlocked with the slat 14 and it is also adapted to secure the slat assembly 10 to the body panel 12. The fastening means for this purpose will be described presently. The end cap 16 is a unitary molded plastic body and comprises a shank 42 adapted to telescope into the end of the slat 14 and it comprises a head 44 which is disposed externally of the slat. The shank 44 comprises the bottom wall 46 and a pair of upstanding side walls 48 defining a channel therebetween. The cross-sectional configuraion of the shank 42 is adapted to fit snugly inside the slat 14 with the upper edges of the walls 48 in engagement with the rolled sections of the side walls 26 of the slat. The bottom or lower surface of the shank 42 is provided with a centrally disposed recess 52 which is bounded on the upper side by a ramp surface 54. A passage 56 extends through the bottom wall 46 adjacent the recess 52 for purposes to be described subsequently. The inner end of the shank 42 is beveled at its lower and upper edges across the width of the shank.

A threaded stud 62, for securing the end cap to the body panel, is carried by the end cap at a location adjacent the head. The stud 62 has its head molded inside the shank 42 and the threaded shank extends perpendicularly from the lower surface of the shank. The threaded stud 62 receives a nut 63 as will be described subsequently.

The head 44 of the end cap is of somewhat larger cross-section at its juncture with the shank 42 and is provided with a peripherally extending axial shoulder 64. The shank 42 is provided on its bottom surface with a boss 66 of the same shape as the slot 32 in the base of the slat 14. The axial shoulder 64 extends around the end of the head 44 and also around the boss 66 and has a transverse dimension about the same as the thickness of the sheet metal of the slat 14 so that the surface of the head and the surface of the slat are flush when the end cap is telescoped into the slat. The head 44 of the end cap is provided with a transversely extending eyelet 68 for receiving a tie down cord or end fitting for securing articles on the slat assemblies.

The slat 14 and the end cap 16 are assembled by inserting the shank 42 into the end of the slat until the shoulder 64 engages the end of the slat. This motion of the end cap relative to the slat causes the bottom of the shank 42 to engage the free end of the tang 36 and depress it until the recess 52 is opposite the free end of the tang. When the tang is opposite the recess 52 it will spring upwardly and when the shoulder 64 is seated against the end of the slat the tang 36 will engage the ramp surface 54. The tang 36 and the ramp surface 54 coact as detent elements and lock the end cap 16 in a predetermined position relative to the slat 14. With the end cap so positioned, the boss 66 on the bottom surface thereof is nested with the slot 32 and the threaded stud 62 extends downwardly from the bottom of the slat assembly for insertion into the mounting hole in the body panel 12. The slat assembly 10 is completed by inserting the rub strip 22 into the open upper side of the slat by a lateral snap fit between the flanges 28. In the event that it is desired to remove the end cap 16 from the slat 14, the rub strip 22 is removed and a tool, such as a screw driver bit, is inserted through the passage 56 to deflect the tang 36 downwardly away from the ramp surface 54 to allow the end cap 44 to be withdrawn from the slat.

The slat assembly, assembled as described above, is readily mounted on the vehicle body panel by inserting the studs 62 at opposite ends thereof into the mounting holes in the panel and applying the nut 63 to the studs. Thus, the slat assembly is supplied to the vehicle manufacturer as a unit. It is readily installed on the vehicle as a unit without loose parts, except the nuts, and without need for special tooling.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In an article carrier for an automotive vehicle, said carrier being of the type comprising a slat assembly adapted to be mounted on a body panel of said vehicle, said slat assembly including a slat having a base member and a pair of oppositely disposed, spaced side walls forming a channel, and including an end cap comprising a shank member extending into one end of said slat, and fastening means for securing said end cap to said slat and for securing said slat to said body panel, the improvement wherein said end cap and slat are preassembled for mounting as a unit on said body panel and said fastening means comprises:
    said shank member having a cross-section which is slidably insertable into said one end of said slat,
    means on said side walls for holding said shank member against said base member when said shank member is slidably inserted into said slat,
    detent means coacting between said shank member and said base member for holding said end cap against withdrawal after insertion of said shank member to a predetermined position, said detent means including an element which is deflectable by sliding motion of said shank member,
    and a fastener for securing said end cap to said body panel, said fastener being carried by and integral with said end cap and having a fastener shank adjacent the end of said base member after insertion of said shank member to said predetermined position.

2. The invention as defined in claim 1 wherein:
said slat is formed of sheet metal,
said end cap is a unitary plastic body comprising a head on said shank member extending beyond the end of said slat, said detent means comprises first and second detent elements, said first detent element being a resilient element on one of said members and said detent element being disposed on the other of said members and engageable by said resilient detent element.

3. The invention as defined in claim 2 wherein:

said end cap includes an abutment shoulder adapted to engage the end of said slat when said shank is inserted into said channel in said predetermined position.

4. The invention as defined in claim 2 wherein:
said first detent element is a tang pierced from said base member and extending obliquely thereof,
and said second detent element is a retaining surface on the bottom of the shank member of said end cap.

5. The invention as defined in claim 1 wherein:
said fastener is a stud having a head molded in the shank member of said end cap and having a shank extending downwardly from the lower surface thereof, said base member defining a slot at said one end of said slat, said slot being adapted to receive said shank of said stud when said end cap is inserted into said channel,
said shank of said stud being adapted to receive a nut for fastening said end cap to said body panel.

6. The invention as defined in claim 4 wherein:
said shank of said end cap defines a vertical passage adjacent said retaining surface whereby a tool may be inserted into said channel and said passage for releasing said tang from said retaining surface.

7. The invention as defined in claim 4 wherein said retaining surface is a ramp-shaped surface extending obliquely of the base member.

* * * * *

UNITED STATES PATENT AND TRADEMARK OFFICE
CERTIFICATE OF CORRECTION

PATENT NO. : 4,767,040

DATED : August 30, 1988

INVENTOR(S) : Miller et al

It is certified that error appears in the above-identified patent and that said Letters Patent is hereby corrected as shown below:

Column 1, line 32, after "body" insert all of the text beginning with the word "panel" in Column 1, line 61 and ending with the word "support" in Column 2, line 22.

Line 32, delete "bail" and insert -- ball --.

Line 47, delete "havine" and insert -- having --.

Line 61, delete all of the text beginning with the word "panel" in Column 1, line 61 and ending with the word "support" in Column 2, line 22.

Column 2, line 55, delete "a" (second occurrence) and insert -- as --.

Line 64, delete "salt" and insert -- slat --.

UNITED STATES PATENT AND TRADEMARK OFFICE
CERTIFICATE OF CORRECTION

PATENT NO. : 4,767,040

DATED : August 30, 1988

INVENTOR(S) : Miller et al

It is certified that error appears in the above-identified patent and that said Letters Patent is hereby corrected as shown below:

Column 3, line 23, delete "44" and insert -- 42 --.

Column 4, line 65, after "said" insert -- second --.

Signed and Sealed this

Eleventh Day of July, 1989

Attest:

DONALD J. QUIGG

*Attesting Officer*       *Commissioner of Patents and Trademarks*